United States Patent [19]

Loveless

[11] Patent Number: 4,494,572
[45] Date of Patent: Jan. 22, 1985

[54] FOUR-WAY POPPET VALVE ASSEMBLY

[75] Inventor: Stanley M. Loveless, Oshtemo Township, Kalamazoo County, Mich.

[73] Assignee: Humphrey Products Company, Kalamazoo, Mich.

[21] Appl. No.: 430,077

[22] Filed: Sep. 30, 1982

[51] Int. Cl.³ .............................................. F15B 13/02
[52] U.S. Cl. .......................... 137/596.17; 137/625.5; 137/870; 91/466
[58] Field of Search .............. 137/596, 596.17, 625.27, 137/625.5, 870; 91/466

[56] References Cited

U.S. PATENT DOCUMENTS

| | | | |
|---|---|---|---|
| 614,798 | 11/1898 | Dodge | 137/596 X |
| 2,658,523 | 11/1953 | Johnson | 137/625.27 X |
| 3,480,041 | 11/1969 | Whitlock | 137/625.5 X |
| 4,074,700 | 2/1978 | Engle | 137/625.27 |

FOREIGN PATENT DOCUMENTS 133929 12/1974 Japan .

Primary Examiner—Gerald A. Michalsky
Assistant Examiner—John C. Fox
Attorney, Agent, or Firm—Flynn, Thiel, Boutell & Tanis

[57] ABSTRACT

A four-way poppet valve having a housing provided with a pair of parallel bores, and a pair of valve stems slidably supported within the bores, each valve stem having one or more elastomeric poppets thereon for controlling fluid flow. A supply port communicates with one of the bores, whereby flow therethrough is controlled by the respective shiftable valve stem through intermediate passages to the second bore, which second bore communicates with both the exhaust port and a pair of load ports. The shiftable valve stem in the second bore respectively controls flow between the ports which communicate therewith. The bores, and the valve stems associated therewith, define various chambers which cooperate with the poppets on the respective valve stems for confining therein fluid pressure so that the valve poppets, when in a closed or seated condition, are always urged in the seated direction by the fluid pressure.

6 Claims, 3 Drawing Figures

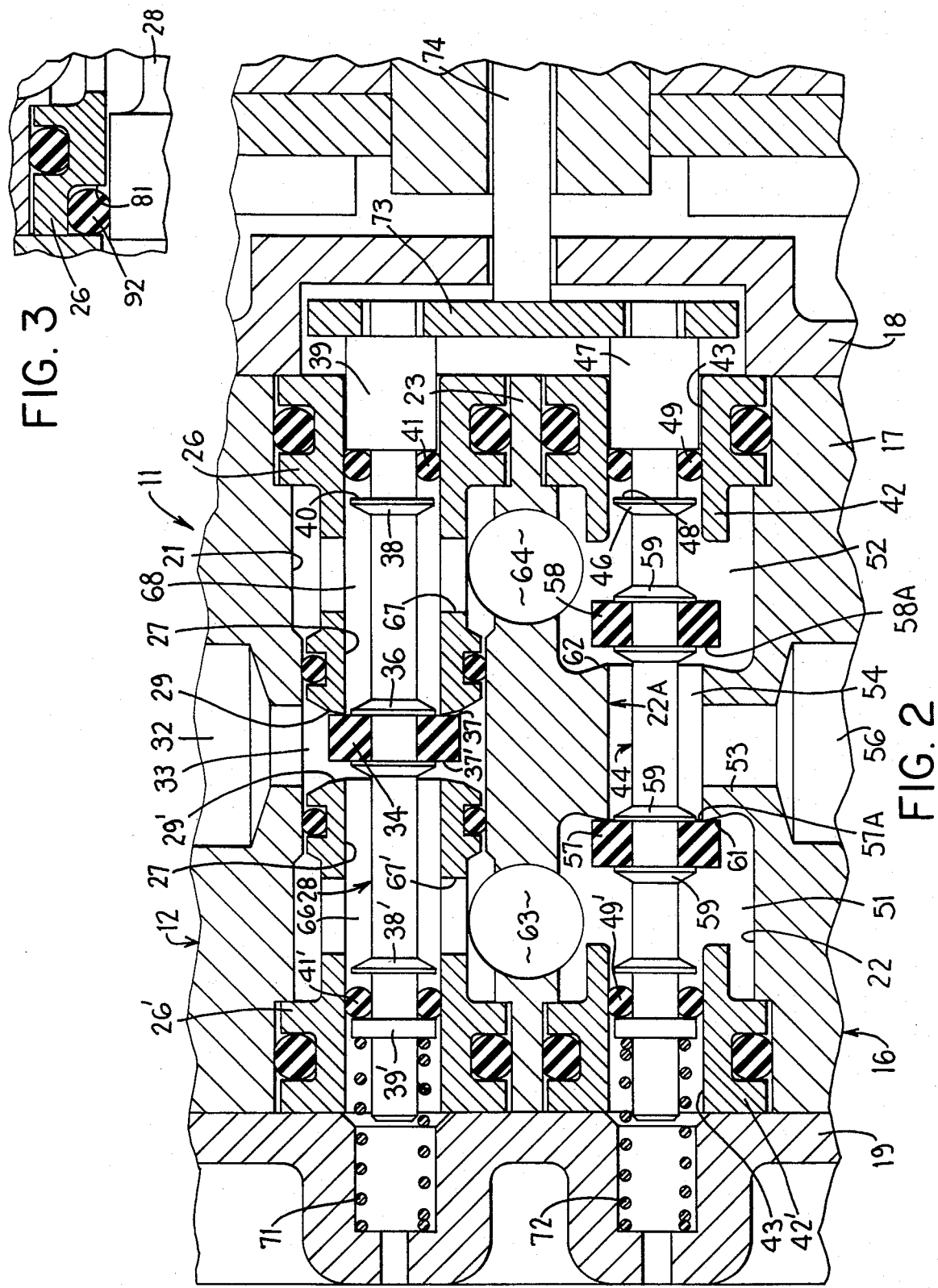

FOUR-WAY POPPET VALVE ASSEMBLY

FIELD OF THE INVENTION

This invention relates to an improved four-way poppet valve for controlling the flow of a pressurized fluid, usually air.

BACKGROUND OF THE INVENTION

Four-way valves of the spool type have been, and still are, extensively utilized. In this spool-type valve, a control spool is slidably supported within a housing, and a plurality of elastomeric O-rings coact between the spool and the housing for creating a slidable but sealed engagement therebetween. Even though extensively utilized, these spool-type four-way valves have possessed operational features which have long been recognized as undesirable. For example, the presence of the elastomeric O-rings for creating a slidable seal between the spool and housing imposes a substantial frictional drag which impedes free shifting of the spool, and also causes substantial wear of the O-rings due to the continual sliding therealong.

Because of the friction and wear problems associated with spool-type four-way valves, attempt have been made to provide a satisfactory four-way elastomeric poppet valve, although to the best of my knowledge no one has previously succeeded in designing a four-way elastomeric poppet valve having characteristics which would be considered more closely approaching optimum performance.

For example, with a four-way poppet valve, the valve is again provided with shiftable valve stems or spools, but in this case the valve stem mounts an enlarged elastomeric rigid valve seat (i.e., a poppet) which moves into and out of engagement with rigid valve seats formed on the housing. This thus minimizes wear of the poppet, and also greatly reduces friction during the shifting or sliding of the valve stem. However, while prior four-way poppet rigid valves have minimized or overcome the wear and friction problems associated with spool-type valves, nevertheless the known poppet valves have created additional undesired characteristics.

For example, most of the known four-way poppet valves have required a substantial number of valve stems so that the overall valve assembly is structurally and mechanically complex. For example, U.S. Pat. No. 3,963,048, as owned by the assignee of this application, discloses a four-way poppet valve which requires four separate valve stems each having a poppet thereon to achieve a four-way valving function.

Another, and more significant, problem associated with four-way poppet valves is that such valves have normally required one or more poppets to seal against the fluid pressure. That is, when the poppet is seated against its valve seat so as to be in a closed position, the fluid pressure acts against the poppet in a direction tending to push the poppet away from its closed or seated condition. This hence increases the difficulty of obtaining a desirable sealed relationship when the poppet is closed. For example, it has been observed that as the pressure of the fluid is increased, it is necessary to increase the hardness of the elastomeric poppet to prevent leakage when sealing against pressure, and this in itself creates an undesirable condition because the harder material of the poppet usually will not seal as well under operating conditions involving low fluid pressures. Likewise, as the fluid pressure increases, the valve requires a proportionally greater force to hold the poppet against the valve seat, and this is also an undesirable condition.

Accordingly, it is an object of this invention to provide an improved four-way poppet valve which overcomes the above-mentioned disadvantages.

More specifically, it is an object of the present invention to provide a four-way poppet valve which utilizes only two shiftable valve stems.

A further object of the invention is to provide a four-way poppet valve, as aforesaid, wherein the poppets seal with, or in the direction of, the net pressure exerted by the pressurized gas, such that the pressure acts to press the poppet onto rather than push it off of the seat.

It is a further object of the invention to provide a valve, as aforesaid, that provides longer poppet life and reduced operating energy consumption due to the substantial balance of pressures on the poppets.

The present invention relates to a four-way poppet valve having a housing provided with a pair of parallel bores, and a pair of valve stems slidably supported within the bores, each valve stem having one or more elastomeric poppets thereon for controlling fluid flow. A supply port communicates with one of the bores, whereby flow therethrough is controlled by the respective shiftable valve stem through intermediate passages to the second bore, which second bore communicates with both the exhaust port and a pair of load ports. The shiftable valve stem in the second bore respectively controls flow between the ports which communicate therewith. The bores, and the valve stems associated therewith, define various chambers which cooperate with the poppets on the respective valve stems for confining therein fluid pressure so that the valve poppets, when in a closed or seated condition, are always urged in the seated direction by the fluid pressure.

BRIEF DESCRIPTION OF THE DRAWINGS

FIG. 2 is a partial enlarged view of the valve portion shown in FIG. 1.

FIG. 3 is an enlarged fragmentary sectional view of an alternative embodiment of the valve assembly.

Figure 1:
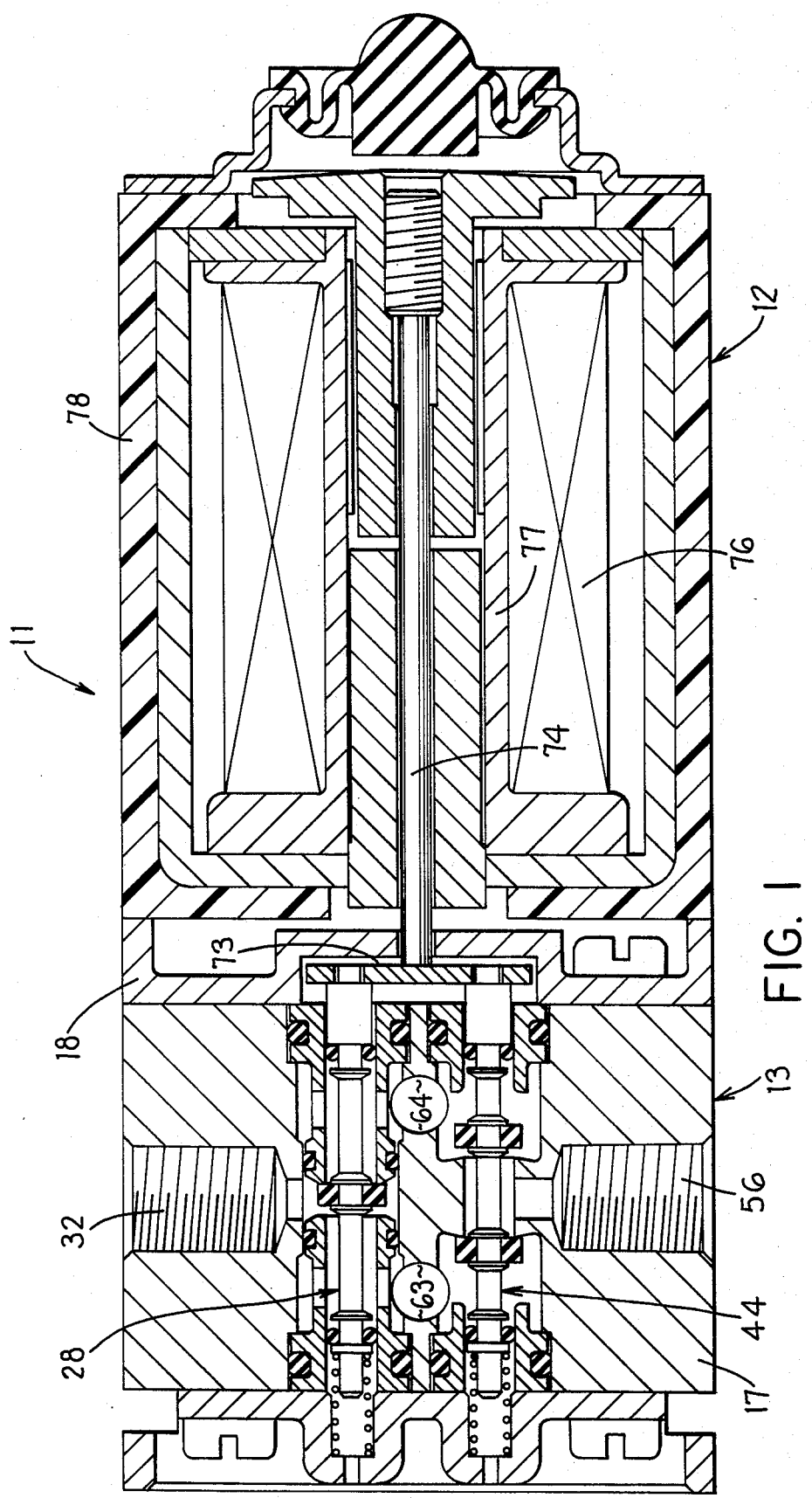
FIG. 1 is a central sectional view of a valve embodying the invention.

Certain terminology will be used in the following description for convenience in reference only and will not be limiting. For example, the words "upwardly" and "downwardly" will refer to directions in the drawings to which reference is made. The words "inwardly" and "outwardly" will refer to directions toward and away from, respectively, the geometric center of the valve and designated parts thereof. Said terminology will include the words specifically mentioned, derivatives thereof and words of similar import.

DETAILED DESCRIPTION

Referring to FIGS. 1 and 2, there is illustrated a four-way poppet valve assembly 11 including an electrical operating portion 12 and a valve portion 13. While the valve and operating portions are made for close cooperation with each other, nevertheless it will be appreciated that the valve portion 13 will itself operate effectively with other operators including mechanical and fluid pilot operators.

With reference to the valve portion 13, there is provided a housing means 16 which includes a central housing member 17 having removable end caps 18 and 19 secured thereto. The central housing 17 has a pair of substantially parallel cylindrical bores or openings 21 and 22 extending therethrough. These bores are sidewardly spaced such that the central housing 17 hence includes an intermediate wall portion 23 which effectively separates the bores from one another.

The bore 21 has a pair of identical sleevelike liners 26–26' fixedly and sealingly positioned within the opposite ends thereof in opposed and coaxial alignment with one another. These liners 26–26', which effectively function as and comprise a part of the central housing 17, define a cylindrical valve bore 27 in which a valve stem or plunger 28 is axially slidably disposed, as described hereinafter. The inner ends of liners 26–26' define thereon a pair of opposed valve seats 29–29', which valve seats surround the bore 27 and are of an annular, conically tapered convex configuration. These valve seats 29–29' are axially spaced a selected distance from one another so as to define an annular chamber or region 33 therebetween. This annular chamber 33 is in continuous communication with a supply or inlet port 32 which extends radially through the central housing 17 for communication with a source of pressurized fluid such as air.

The valve stem 28 mounts a single ringlike elastomeric valve poppet 34 thereon, which valve poppet is confined between a pair of shoulders or flanges 36. This valve poppet 34, as positioned within the annular chamber 33, has substantially flat annular end faces or surfaces 37–37' which are oppositely axially directed and hence are disposed for sealing engagement with the valve seats 29–29' respectively, as described hereinafter.

The opposite ends of the valve stem 28 are slidably and sealingly supported on the liners 26–26'. One end of stem 28 has a pair of opposed flanges or collars 38–39 which define a surrounding annular groove 40 therebetween. A conventional elastomeric O-ring 41 is confined within the groove 40, which O-ring 41 is sized to create a slidable sealed engagement with the bore 27. The groove 40 has an axial width which substantially exceeds the diameter of O-ring 41 so as to permit limited axial displacement of the O-ring 41 relative to the valve stem, as explained hereinafter.

The other end of valve stem 28 has similar collars 38'–39' for confining an O-ring 41', the latter being slidably and sealingly engaged with the bore of liner 26'.

Considering now the second bore 22, same is provided with a pair of identical sleevelike liners 42–42' fixedly and sealingly mounted in opposed relationship within the opposite ends thereof, which liners effectively function as and comprise a part of the central housing 17. The liners 42–42' define a valve bore 43 in which a second valve stem or plunger 44 is axially slidably disposed in parallel relationship to the first valve stem 28. The opposite ends of valve stem 44 are slidably sealingly engaged with the liners, and for this purpose valve stem 44 has end structure substantially identical to that of valve stem 28. That is, valve stem 44 has opposed flanges or collars 46–47 defining an enlarged groove 48 therebetween for confining an O-ring 49, the latter being smaller than the width of groove 48 but disposed in slidable sealed engagement with the bore 43. An identical seal ring 49' is provided on the other end of valve stem 44 for slidable and sealing engagement with the other liner 42'.

The valve stem 44 extends coaxially through the bore 22, and the latter is effectively divided into two end chambers 51 and 52 which are effectively or at least partially separated by an intermediate partition or wall 53, the latter in the preferred embodiment being integral with the central housing 17. This divider wall 53 has a reduced diameter portion 22A of bore 22 extending therethrough and defining a central chamber 54 which provides communication between the end chambers 51–52. Bore 22A is of the same diameter as bore 43. The central chamber 54 is in continuous communication with an exhaust port 56 which extends radially through the central housing 17.

The valve stem 44 mounts thereon a pair of identical ringlike elastomeric valve poppets 57 and 58 positioned so as to be disposed in the end chambers 51 and 52, respectively. These poppets 57–58 are each confined on the valve stem by appropriate annular flanges or collars 59. The elastomeric poppets 57–58 each have a substantially flat end surface 57A–58A which faces toward the divider wall 53 and which functions as a seal face. At the same time, the divider wall 53 has the opposite surfaces 61 and 62 thereof, as disposed in surrounding relationship to chamber 54, formed as annular conical convex surfaces which function as valve seats for creating a sealed engagement with the poppets 57 and 58, respectively. The axial spacing between valves seats 61–62 is slightly less than the axial spacing between poppet seal faces 57A–58A so that only one valve seat 61–62 can be sealingly engaged by its respective poppet 57–58 at any one time.

The valve housing 17 also has first and second load passages 63 and 64 formed therein, which passages terminate in respective external load ports which are adapted for connection to an appropriate load device, such as opposite ends of a conventional pneumatic pressure cylinder. These load passages 63–64, in the illustrated embodiment, are conveniently formed so as to extend diametrically across the central axis of the central housing 17 so as to hence project substantially through the divider wall 23, whereupon the passages 63 and 64 hence directly and continuously communicate with the end chambers 51 and 52, respectively. The first load passage 63 also is in continuous communication with a first annular supply passage 66 as defined between the valve stem 28 and the liner 26', which passage 66 is adapted for communication with the supply chamber 33. The liner 26' has appropriate openings 67' extending radially therethrough for providing continuous communication between passages 63 and 66. In similar fashion, the second load passage 64 is in continuous communication with a second annular supply passage 68 as formed between valve stem 28 and liner 26 through radial openings 67 as formed in the liner 26.

In the illustrated embodiment, the valve stems 28 and 44 are respectively biased by springs 71 and 72 into their rightward end positions substantially as illustrated by FIG. 2. The opposite ends of valve stems 28 and 44 are also connected to a common operating plate 73, and the latter in turn is connected to the operating plunger or rod 74 associated with the electrical operating portion 12.

The operator portion 12 is substantially conventional in that it comprises a conventional electrically energizeable solenoid coil 76 supported on a spool 77, which spool and coil are appropriately fixedly positioned within a housing 78 conventionally formed of a nonconductive material. The metallic plunger 74 is coaxially slidably supported within the spool and projects coaxially into the valve housing for connection to the operating plate 73.

OPERATION

The operation of the poppet valve assembly illustrated in FIGS. 1 and 2 will be briefly described to insure a complete understanding thereof.

When the solenoid coil 76 is deenergized, the return springs 71–72 maintain solenoid plunger 74 and valve stems 28 and 44 in the end positions shown in FIG. 2. When the valve assembly is in this position, pressurized gas will flow through inlet port 32 into central chamber 33, then past the valve seat 29' into passage 66, from which the pressurized gas flows directly into the adjoining load port 63. The pressurized gas further flows into the adjoining chamber 51. The pressurized gas within the chambers 33 and 51 hence acts against the respective elastomeric poppets 34 and 57 so as to urge or bias the poppets into sealing and seating engagement with the respective valve seats 29 and 61.

With the valve assembly in the position illustrated by FIG. 2, as described above, the other load port 64 is sealingly isolated from the supply chamber 33 due to the poppet 34 being seated against the valve seat 29. However, supply passage 68 communicates with end chamber 52 and with center chamber 54 and exhaust port 56 due to valve poppet 58 being in its open position. Hence, load port 64 is connected to the exhaust when the load port 63 is connected to the supply.

When it is desired to reverse the connections of load ports 63 and 64, then solenoid coil 76 is energized whereupon the plunger 74 moves leftwardly and hence causes simultaneous leftward shifting of valve stems 28 and 44 in opposition to the urging of the springs. This causes valve poppets 34 and 57 to respectively move out of sealing engagement with the valve seats 29 and 61, and shortly thereafter the poppets 34 and 58 respectively sealingly engage the valve seats 29' and 62. Hence, load port 63 is now effectively isolated from the supply port 32, but instead communicates through chambers 51 and 54 with the exhaust port 56. Simultaneously therewith, the other load port 64 is now isolated from the exhaust port 56 due to closing of poppet 58 against valve seat 62, but said load port 64 now communicates with supply port 32 through the intermediate supply passage 68. The valve assembly will remain in this latter position so long as the operator 12 is energized, but will automatically return to its rightwardmost position due to urging of springs 71 and 72 when the solenoid 76 is deenergized. When in this energized (that is, its leftwardmost) position, the pressure of the fluid within chambers 33 and 52 acts on poppets 34 and 58 so as to urge or bias the poppets in a direction tending to sealingly seat them against their respective valve seats 29' and 62.

Hence, with the four-way poppet valve of this invention, as explained above, the pressurized fluid always acts on the poppets in such manner as to urge all of the poppets in a direction tending to seat the poppets against their respective seats when a sealing relationship is created, both when the valve is in its energized and its deenergized position.

One of the desirable features of the valve assembly of this invention is the substantial balance of forces which exists on the valve stems when in their opposite end positions. For example, when in the rightward end position illustrated by FIG. 2, the pressurized fluid is contained within chambers 33, 66 and 51, and hence acts on the valve stems 28 and 44. This pressurized fluid imposes a leftwardly directed pressure force on the stem 28 due to the pressure fluid acting against the O-ring 41', which pressure force hence acts over an annular area defined between the inner diameter of bore 27 and the outer diameter of valve stem 28 as defined by its contact area with the O-ring. This same pressurized fluid, however, also imposes a rightwardly directed force on the valve stem 28 due to the action of this pressure fluid on the poppet 34. The unbalanced pressure force imposed on the poppet 34 acts over an area having an inner diameter equal to the diameter of the valve stem 28 and an outer diameter as defined by the outer periphery of the seal area created between poppet 34 and conical valve seat 29. Since this seal area between valve seat 29 and poppet 34 has an outer diameter which is substantially equal to, but generally just slightly exceeds the diameter of bore 27, the rightward force as imposed on poppet 34 hence balances and preferably just slightly exceeds the leftward pressure force imposed on stem 28 through the O-ring 41'.

When valve stem 28 is shifted leftwardly, the same area and pressure relationship exist as described above, so that a very small unbalanced pressure force urges poppet 34 against seat 29'.

Valve stem 44 has the same area and pressure relationships due to bores 43 and 22A being of the same diameter, so that poppets 57 and 58 are each, when closed, urged in the closing direction by a very small unbalanced pressure force.

Hence, each of the valve stems 28 and 44 is thus subjected to a very slight unbalanced pressure force exerted thereon by the inlet or supply gas, which unbalanced pressure force always acts in the direction to urge the poppet into sealing engagement with its respective valve seat. This hence permits substantial minimization of poppet wear, and substantial minimization of the force, and hence energy, required by the operator to effect shifting of the valve stems.

The valve assembly 11 as shown is of the single solenoid type, with the solenoid operating from one end and the return springs 71 and 72 operating at the other end for exerting force in the opposite direction. The valve of the present invention can just as easily be of the double solenoid type having electrical operators at each end. The valve assembly 11 could also be single or double pilot operated, as well as mechanically or manually operated.

In the valve assembly shown above, the nearly complete balance of forces on the valves correspondingly require a minimal amount of operating force, and the electrical operating portion therefore preferably operates electrically with a power of 1 watt or less. The widened O-ring grooves 40 and 48 also minimize the amount of energy required for operation by keeping "break-out" friction to a minimum. This minimum "break out" is achieved due to the fact that the stem can start its movement through the inside diameter of the O-ring rather than having to initially move the outside diameter of the O-ring through the bore, there thus being less area of contact.

The valve assembly of the invention can be used as either an "in-line" mounted valve, or a sub-base or manifold mounted valve. Although the four-way valve of the invention is especially effective in very small sizes, it can also be employed in larger sizes according to need. The balanced design of the inventive valve provides excellent flow capacity relative to the physical size of the valve. The nearly balanced internal forces of the inventive valve, in addition to minimizing the amount of force needed to operate the valve, also provide optimum life for the poppets and other moving parts. In particular, it is believed that the effective life of the poppets may be increased 10 to 20 times relative to comparable four-way valves.

FIG. 3 illustrates an alternate, although less preferred, embodiment for creating a slidable seal between the ends of the valve stems and the liners. In this case, the liner is provided with an interior groove 81 for confining therein a conventional elastomeric O-ring 92 which creates a slidable seal with the exterior periphery of the cylindrical end portion of the valve stem. This alternate sliding seal arrangement can be associated with both ends of each valve stem.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A four-way, poppet-type valve assembly, comprising:

a valve housing including a main one-piece body portion having first and second substantially parallel and elongated openings therein;

a pair of first sleeves sealingly and stationarily disposed within the opposite axial ends of said first opening in axially opposed and spaced relationship, said first sleeves having inner axial end surfaces which are disposed in axially opposed and axially spaced relationship from one another and define a central chamber therebetween, said pair of first sleeves having coaxially aligned bores of a first substantially uniform diameter extending therethrough and defining a pair of end chambers which communicate with opposite sides of said central chamber;

the axially inner end surface of each said first sleeves defining thereon a first annular valve seat which is of a generally conical configuration and projects axially outwardly toward the valve seat formed on the other of said first sleeves, each of said valve seats having a sealing diameter which only slightly exceeds said first diameter;

first elongated valve plunger means disposed within and supported for shiftable axial movement along said first opening, said first plunger means including a central part having first elastomeric poppet means mounted thereon in encircling relationship thereto and disposed within the central chamber of said first opening, said first plunger means also having end parts which are disposed on opposite axial sides of the central part and project through the respective end chambers, and annular elastomeric sealing means creating a slidable and sealed relationship between each said end part and a respective said first sleeve for sealingly closing the outer end of the respective end chamber, said annular elastomeric sealing means defining an annular sealing area which is substantially of said first diameter and which permits relative axial sliding but sealed engagement between said first sleeve and said end part of said first plunger means;

a pair of second sleeves stationarily and sealingly seated within opposite ends of said second opening in axially opposed and spaced relationship, said second sleeves having coaxially aligned bores extending therethrough of a second diameter;

wall means stationarily positioned with respect to said body portion substantially centrally of said second opening, said second opening having a central portion which is substantially of said second diameter and extends through said wall means in coaxial alignment with the bores of said second sleeves, said wall means being disposed axially between but axially spaced from the inner axial ends of said second sleeves so as to define a pair of end chambers which are disposed on opposite sides of said wall means and are joined together by a central chamber as defined by said central portion of said second opening;

said wall means defining a pair of second annular valve seats on opposite axial sides thereof in surrounding relationship to the opposite axial ends of said central portion, each said second valve seat being of a conical configuration which projects axially outwardly toward the inner axial end of the respectively adjacent second sleeve and has a sealing diameter which only slightly exceeds said second diameter;

second elongated valve plunger means disposed within said second opening and being supported for shiftable axial movement therealong, said second valve plunger means extending axially of said second opening and having end parts which are slidably sealingly supported within said second sleeves, and annular elastomeric sealing means creating a slidable and sealed engagement between each said end part and the respective second sleeve, said sealing means including an annular slidable seal area having a diameter substantially equal to said second diameter;

said second plunger means having a central part which extends through said central chamber of said second opening and projects into the adjacent end chambers, said central part having a pair of second elastomeric poppet means mounted thereon in encircling relationship, said pair of second poppet means being axially spaced so that said wall means is disposed axially therebetween, whereby one of said second poppet means is disposed within each of said end chambers and is disposed for engagement with the respectively adjacent second valve seat;

each of said poppet means comprising an elastomeric ring member which stationarily surrounds the respective valve plunger means and has effective outer and inner diameters which respectively are greater than and less than the diameter of the respective valve seat so that the latter sealingly contacts the central annular part of the axial end face of the elastomeric ring member when the latter is sealingly engaged therewith;

said body portion having an inlet passage formed therein and communicating directly with the central chamber of said first opening for permitting pressure fluid to be supplied thereto, and an outlet passage formed therein and communicating directly with the central chamber of said second opening for permitting said fluid to be suitably discharged;

a first load port formed in said body portion and disposed in continuous communication with one end chamber of each of said first and second openings, and a second load port formed in said body portion in continuous communication with the other end chamber of each of said first and second openings; and operator means coupled to said first and second valve plunger means for effecting simultaneous linear shifting thereof between two end operational positions;

whereby the presence of pressurized fluid within the central chamber of said first opening or within any of said end chambers creates only a minimal unbalanced pressure force acting on the respective poppet means for holding it in its closed position.

2. A valve assembly according to claim 1, wherein the sealing means includes an elastomeric seal ring mounted on and surrounding the respective plunger means and having an outer diameter disposed in slidable sealing engagement with a wall defining the respective bore, the respective said plunger means having an axially elongated annular groove for confining said seal ring therein, said groove having an axial length significantly greater than the diameter of said seal ring to permit relative axial displacement of the plunger means relative to the seal ring to minimize the sliding friction when the plunger means is initially moved away from its end position.

3. A valve assembly according to claim 1, wherein said first and second openings are disposed closely adjacent one another in parallel relationship, said body portion having a partition wall which separates said first and second openings from one another, and said first and second load ports comprising bores which are formed in said body portion in substantially perpendicular relationship to a plane containing the longitudinal axes of said first and second openings, the bores defining said first and second load ports extending directly through said partition wall so that said load ports are disposed directly between said first and second openings and directly communicate therewith.

4. A valve assembly according to claim 1, wherein said operator means includes electrical solenoid means fixedly mounted on one end of said body portion and having a movable plunger which projects toward the body portion and has a bridging member fixed thereto and extending transversely thereof, said bridging member having one end of each of said first and second plunger means fixedly secured thereto, and spring means associated with the other end of each of said plunger means and coacting between the housing and the respective plunger means for urging the plunger means toward one of its end positions.

5. A four-way, poppet-type valve assembly, comprising:

a valve housing including a main body portion having first and second substantially parallel and elongated openings therein;

a pair of first sleeves sealingly and stationarily disposed within the opposite axial ends of said first opening in axially opposed and spaced relationship, said first sleeves having inner axial end surfaces which are disposed in axially opposed and axially spaced relationship from one another and define a central chamber therebetween, said pair of first sleeves having coaxially aligned first bores extending therethrough and defining a pair of end chambers which communicate with opposite sides of said central chamber;

the axially inner end surface of each said first sleeve defining thereon a first annular valve seat which is of a generally conical configuration and projects axially outwardly toward the valve seat formed on the other of said first sleeves, each of said valve seats defining an annular sealing area of a first diameter;

first elongated valve plunger means disposed within and supported for shiftable axial movement along said first opening, said first plunger means including a central part having first elastomeric poppet means mounted thereon in encircling relationship thereto and disposed within the central chamber of said first opening, said first plunger means also having end parts which are disposed on opposite axial sides of the central part and project through the respective end chambers, and annular elastomeric sealing means creating a slidable and sealed relationship between each said end part and a respective said first sleeve for sealingly closing the outer end of the respective end chamber, said annular elastomeric sealing means defining an annular sealing area which is substantially of said first diameter and which permits relative axial sliding but sealed engagement between said first sleeve and said end part of said first plunger means;

a pair of second sleeves stationarily and sealingly seated within opposite ends of said second opening in axially opposed and spaced relationship, said second sleeves having coaxially aligned second bores extending therethrough;

wall means stationarily positioned with respect to said body portion substantially centrally of said second opening, said second opening having a central portion which is substantially of a second diameter and extends through said wall means in coaxial alignment with the bores of said second sleeves, said wall means being disposed axially between but axially spaced from the inner axial ends of said second sleeves so as to define a pair of end chambers which are disposed on opposite sides of said wall means and are joined together by a central chamber as defined by said central portion of said second opening;

said wall means defining a pair of second annular valve seats on opposite axial sides thereof in surrounding relationship to the opposite axial ends of said central portion, each said second valve seat being of a conical configuration which projects axially outwardly toward the inner axial end of the respectively adjacent second sleeve and has an annular sealing area of a second diameter;

second elongated valve plunger means disposed within said second opening and being supported for shiftable axial movement therealong, said second valve plunger means extending axially of said second opening and having end parts which are slidably sealingly supported within said second sleeves, and annular elastomeric sealing means creating a slidable and sealed engagement between each said end part and the respective second sleeve, said sealing means including an annular slidable seal area having a diameter substantially equal to said second diameter;

said second plunger means having a central part which extends through said central chamber of said second opening and projects into the adjacent end chambers, said central part having a pair of second elastomeric poppet means mounted thereon in encircling relationship, said pair of second poppet means being axially spaced so that said wall means is disposed axially therebetween, whereby one of said second poppet means is disposed within each of said end chambers and is disposed for engagement with the respectively adjacent second valve seat;

each of said poppet means comprising an elastomeric ring member which stationarily surrounds the respective valve plunger means and has effective outer and inner diameters which respectively are greater than and less than the diameter of the respective valve seat so that the latter sealingly contacts the central annular part of the axial end face of the elastomeric ring member when the latter is sealingly engaged therewith;

said body portion having an inlet passage formed therein and communicating directly with the central chamber of said first opening for permitting pressure fluid to be supplied thereto, and an outlet passage formed therein and communicating directly with the central chamber of said second opening for permitting said fluid to be suitably discharged;

a first load port formed in said body portion and disposed in continuous communication with one end chamber of each of said first and second openings, and a second load port formed in said body portion in continuous communication with the other end chamber of each of said first and second openings; and operator means coupled to said first and second valve plunger means for effecting simultaneous linear shifting thereof between two end operational positions;

whereby the presence of pressurized fluid within the central chamber of said first opening or within any of said end chambers creates only a minimal unbalanced pressure force acting on the respective poppet means for holding it in its closed position.

6. A valve assembly according to claim 5, wherein the sealing means includes an elastomeric seal ring mounted on and surrounding the respective plunger means and having an outer diameter disposed in slidable sealing engagement with a wall defining the respective bore, the respective said plunger means having an axially elongated annular groove for confining said seal ring therein, said groove having an axial length significantly greater than the diameter of said seal ring to permit relative axial displacement of the plunger means relative to the seal ring to minimize the sliding friction when the plunger means is initially moved away from its end position.

* * * * *